United States Patent [19]

Chernikhov et al.

[11] 4,347,348

[45] * Aug. 31, 1982

[54] HEAT-RESISTANT HETEROCYCLIC POLYMERS AND METHODS FOR PRODUCING SAME

[76] Inventors: Alexei Y. Chernikhov, prospekt Vernadskogo, 93, kv. 64; Mikhail N. Yakovlev, ulitsa Amurskaya, 8, kv. 93, both of Moscow; Valentina B. Lysova, Pavlovsky posad, ulitsa Juzhnaya, 22, kv. 59, Moskovskaya oblast; Evgeny L. Gefter, B. Dorogomilovskaya ulitsa, 56, kv. 60; Nina N. Shmagina, ulitsa Moldogulovoi, 8, korpus 1, kv. 66, both of Moscow, all of U.S.S.R.

[*] Notice: The portion of the term of this patent subsequent to Oct. 21, 1997, has been disclaimed.

[21] Appl. No.: 161,381

[22] Filed: Jun. 20, 1980

Related U.S. Application Data

[63] Continuation of Ser. No. 912,541, Jun. 5, 1978, abandoned.

[51] Int. Cl.$^3$ ............... C08G 18/18; C08G 18/77; C08G 18/78
[52] U.S. Cl. ............... 528/51; 528/48; 528/52; 528/53; 528/68; 528/73; 528/79; 528/210; 528/211
[58] Field of Search ............... 528/48, 68, 73, 79, 528/210, 211, 51, 52, 53

[56] References Cited

U.S. PATENT DOCUMENTS 3,657,186  4/1972  Craven .................. 528/210
3,674,749  7/1972  Craven .................. 528/73
4,229,560 10/1980  Chernikhov et al. ..... 528/73

Primary Examiner—V. P. Hoke
Attorney, Agent, or Firm—Steinberg & Raskin

[57] ABSTRACT

A heat-resistant heterocyclic polymer consisting of units of the general formula

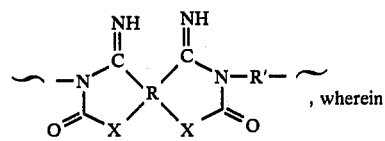

, wherein wherein
R, R$^1$ and X are as defined hereinbelow and a method for producing heat-resistant heterocyclic polymers, consisting in that, at a temperature of 90° to 400° C., there is conducted a reaction of polyfunctional nitrile-containing compounds with polyfunctional isocyanates.

The proposed polymers are stable at temperatures from 300° to 350° C. Materials based thereon are capable of retaining their properties at a temperature of up to 400° C. for long periods of time. The method is simple and can be effected without isolation, purification or drying the polymer, which allows combining the process of producing the polymer with that of producing a finished article.

8 Claims, No Drawings

HEAT-RESISTANT HETEROCYCLIC POLYMERS AND METHODS FOR PRODUCING SAME

This is a continuation, of application Ser. No. 912,541, filed June 5, 1978, now abandoned.

The present invention relates to heat-resistant heterocyclic polymers and methods for producing the same.

These polymers are widely used in the manufacture of various materials, employed, for instance, in electrical engineering, electronics, mechanical engineering, aircraft construction, and tool industry. Such materials can be used at temperatures of 350° to 400° C. and higher.

Known in the prior art is a wide range of materials on the basis of heat-resistant heterocyclic polymers.

However, for the production of such materials only finished polymers are used. Initial monomers cannot be used directly for the production of materials since, while transforming to polymers, they give off by-products (for instance, $H_2O$, $CO_2$, $NH_3$) considerably deteriorating the properties of the materials. Therefore, to obtain materials with optimum properties, a process for producing a polymer is carried out, first, comprising the steps of synthesizing, isolating and purifying the polymer, then, the resulting polymer is processed into an appropriate material. The presence of additional steps (synthesis, isolation and purification of the polymer) makes the production of materials considerably more complicated and expensive; besides, they require additional production space. At the same time, the steps of synthesizing, isolating and purifying polymers can be eliminated by using starting reagents, during the reaction from which no by-products are formed. In this case, the process of producing a polymer can be effected simultaneously with that of producing the material. The reagents possessing such properties are bis-ortho-aminonitriles and bis-ortho-hydroxynitriles, which, while reacting with polyfunctional isocyanates, form heat-resistant polymers of heterocyclic structure, having the general formula:

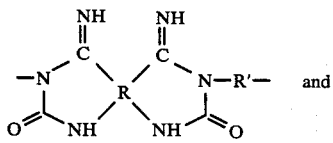

and

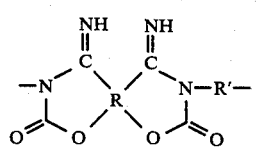

respectively, where R is selected from the group consisting of

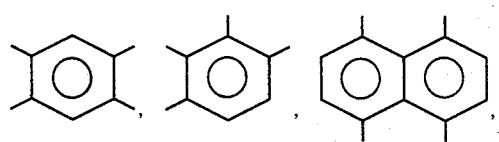

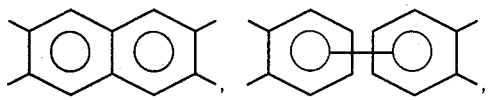

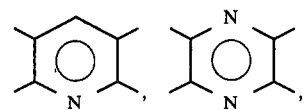

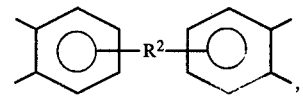

where $R^2$ is selected from the group consisting of an alkene, containing from 1 to 4 carbon atoms,

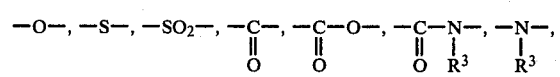

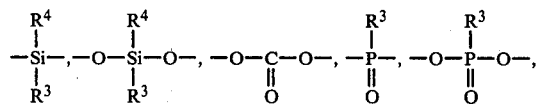

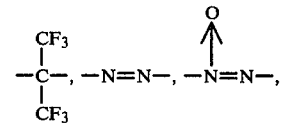

where
$R^3$ and $R^4$ are selected from the group consisting of an alkyl containing from 1 to 3 carbon atoms and an aryl;
$R^1$ is selected from the group consisting of an alkene, containing from 2 to 40 carbon atoms,

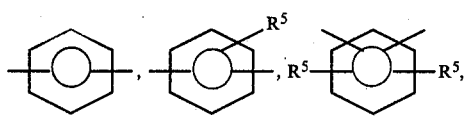

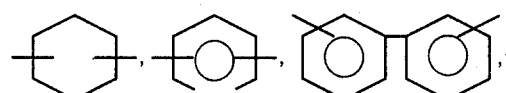

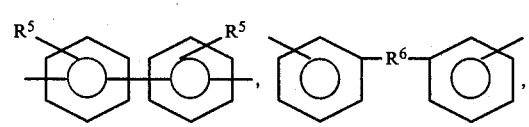

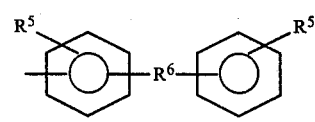

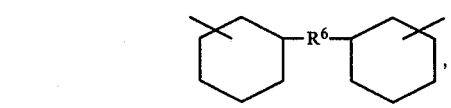

where
$R^5$ is an alkyl containing from 1 to 3 carbon atoms;

$R^6$ is an alkene containing from 1 to 4 carbon atoms;

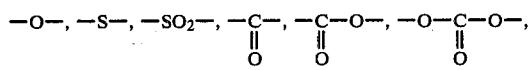

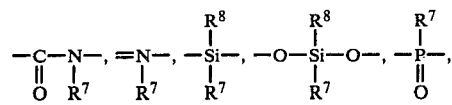

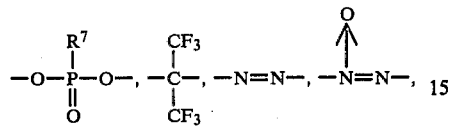

where
$R^7$ and $R^8$ are selected from the group consisting of an alkyl containing from 1 to 3 carbon atoms, and an aryl. The reaction of bis-ortho-aminonitriles or bis-ortho-hydroxynitriles with polyfunctional isocyanates is conducted at a temperature of 130° to 300° C. for 1 to 24 hours. With a view to obtaining homogeneous mixtures on the basis of crystalline reagents with high melting points, it is recommended to heat the reagents for a short time in the presence of a solvent, for instance, toluene, xylene, methylethylketone, acetone, tetrahydrofuran, ethylene glycol dimethyl ether, chloroform, with subsequent removal of the solvent by drying the mixture at a temperature of up to 130° C. The resulting homogeneous mixtures can be used, for instance, as adhesives. The solution containing bis-ortho-aminonitrile or bis-ortho-hydroxynitrile, polyfunctional isocyanate and a solvent, can also be used for impregnating glass, carbon or polyamide fabrics with subsequent evaporation of the solvent. Into the mixtures based on said reagents, there can be introduced various additives (antioxidants, pigments, dyes, other polymers, and resins), as well as other reagents capable of reacting with bis-ortho-aminonitriles, bis-ortho-hydroxynitriles and polyisocyanates (diamines, diols, dithiols, isocyanates).

However, according to test results, polymers obtained from said reagents are characterized by a relatively low thermal stability and can be used for long periods at temperatures of no higher than 250° to 270° C.

It is an object of the present invention to provide heat-resistant heterocyclic polymers which will retain their thermostable properties for long periods at temperatures within the range of from 300° to 350° C.

Another object of the present invention is to provide a method for producing said polymers.

With these and other objects in view, the invention resides in new heat-resistant heterocyclic polymers comprising units of the general formula

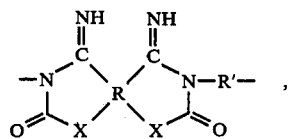

R is an organic radical with a number of carbon atoms of 2 to 3;
an organic radical with a number of carbon atoms of 25 to 1000;

a radical with a number of carbon atoms of 2 to 3 or 25 to 1000, containing from 1 to 1000 silicon atoms, and/or from 1 to 1000 atoms of fluorine and/or from 1 to 1000 atoms of chlorine, and or from 1 to 1000 atoms of bromine, and/or from 1 to 1000 atoms of nitrogen, and/or from 1 to 1000 atoms of sulfur, and/or from 1 to 1000 atoms of phosphorus, and/or from 1 to 1000 atoms of boron, and/or from 1 to 1000 atoms of oxygen;

a radical with a number of carbon atoms of 4 to 24, containing from

|        | 2 to | 1000 atoms of | silicon,    |
|--------|------|---------------|-------------|
| and/or | 7    | 1000          | fluorine,   |
|        | 1    | 1000          | chlorine,   |
|        | 1    | 1000          | bromine,    |
|        | 3    | 1000          | nitrogen,   |
|        | 2    | 1000          | sulfur,     |
|        | 2    | 1000          | phosphorus, |
|        | 1    | 1000          | boron,      |
|        | 4    | 1000          | oxygen;     |

$R^1$ is an organic radical with a number of carbon atoms of 2 to 1000;
a radical with a number of carbon atoms of 2 to 1000, containing from 1 to 1000 atoms of silicon,
and/or from 1 to 1000 atoms of fluorine, and/or from 1 to 1000 atoms of chlorine, and/or from 1 to 1000 atoms of bromine,
and/or from 1 to 1000 atoms of nitrogen, and/or from 1 to 1000 atoms of sulfur, and/or from 1 to 1000 atoms of phosphorus, and/or from 1 to 1000 atoms of boron, and/or from 1 to 1000 atoms of oxygen,
X=NH, O.

According to the invention, the method for producing said polymers consists in conducting a reaction, at a temperature of 90° to 400° C., of polyfunctional nitrile-containing compounds of the general formula $$Y_n\text{—}R\text{—}(CN)_m,$$

where

Y=NH$_2$, OH;
CN is in alpha-, beta-, ortho-, peri-position relative to Y;
n>1;
m>1;
R is an organic radical with a number of carbon atoms of 2 to 3;
an organic radical with a number of carbon atoms of 25 to 1000;
a radical with a number of carbon atoms of 2 to 3 or 25 to 1000, containing from 1 to 1000 atoms of silicon, and/or from 1 to 1000 atoms of fluorine, from 1 to 1000 atoms of chlorine, from 1 to 1000 atoms of bromine, from 1 to 1000 atoms of nitrogen, from 1 to 1000 atoms of sulfur,
and/or from 1 to 1000 atoms of phosphorus, and/or from 1 to 1000 atoms of boron, and/or from 1 to 1000 atoms of oxygen;
a radical with a number of carbon atoms of 4 to 24, containing from 2 to 1000 atoms of silicon,
and/or from 7 to 1000 atoms of fluorine, and/or from 1 to 1000 atoms of chlorine, and/or from 1 to 1000 atoms of bromine, and/or from 3 to 1000 atoms of nitrogen, and/or from 2 to 1000 atoms of sulfur, and/or from 2 to 1000 atoms of phosphorus, and/or from 1 to 1000 atoms of boron, and/or from 4 to 1000 atoms of oxygen,
with polyfunctional isocyanates of the general formula $R^1\text{-}(NCO)_p,$
where $p \geq 2$;

$R^1$ is an organic radical with a number of carbon atoms of 2 to 1000;

a radical with a number of carbon atoms of 2 to 1000, containing from 1 to 1000 atoms of silicon, and/or from 1 to 1000 atoms of fluorine, and/or from 1 to 1000 atoms of chlorine, and/or from 1 to 1000 atoms of bromine, and/or from 1 to 1000 atoms of nitrogen, and/or from 1 to 1000 atoms of sulfur, and/or from 1 to 1000 atoms of phosphorus, and/or from 1 to 1000 atoms of boron, and/or from 1 to 1000 atoms of oxygen.

R can be, for instance, selected from the group consisting of

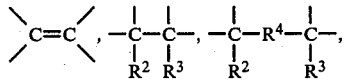

where $R^2$ and $R^3$=H, $C_nH_{2n+1}$, $C_nH_{2n-1}$, X, $C_mX_{2m-q+1}H_q$,

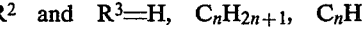

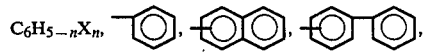

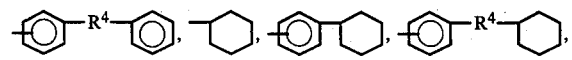

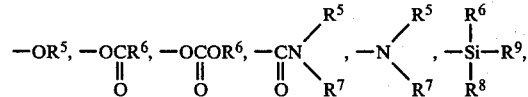

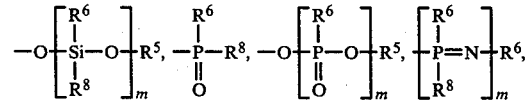

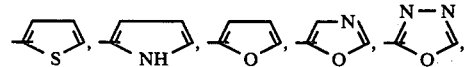

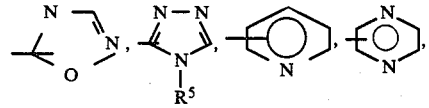

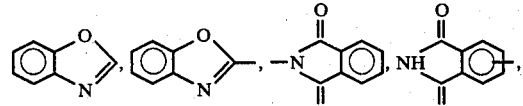

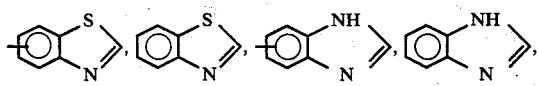

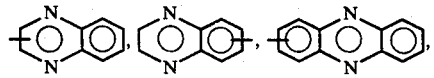

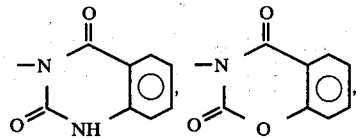

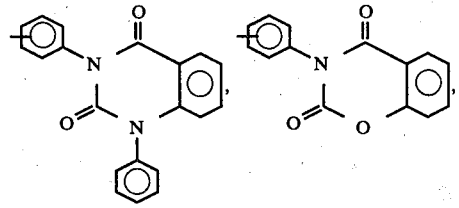

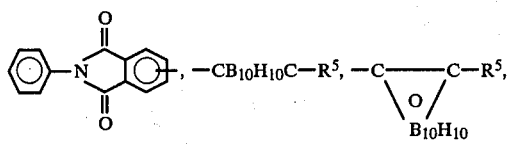

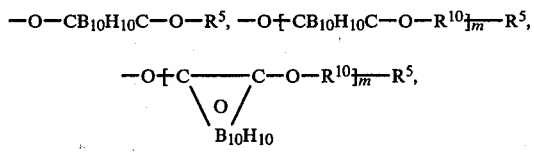

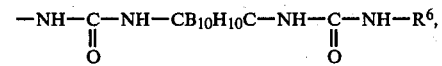

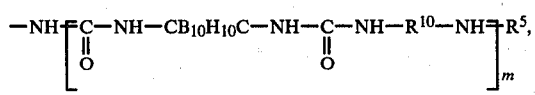

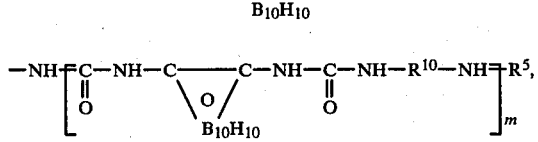

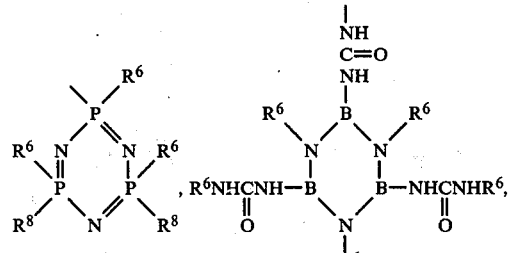

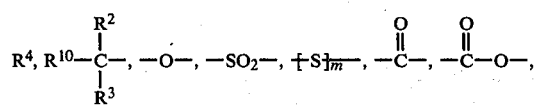

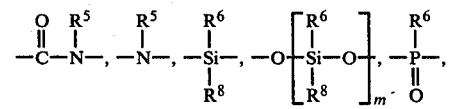

-continued

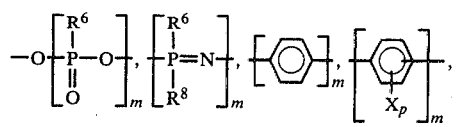

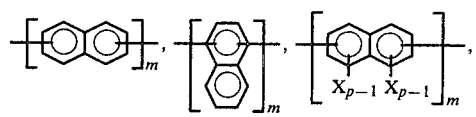

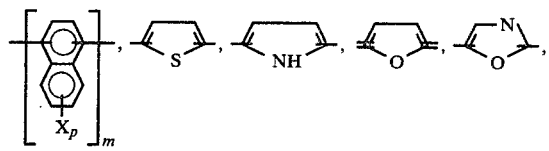

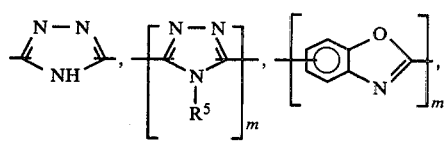

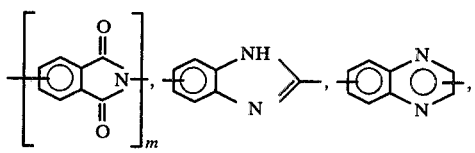

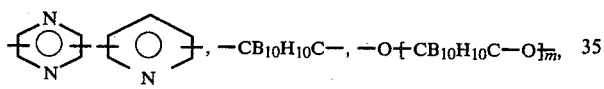

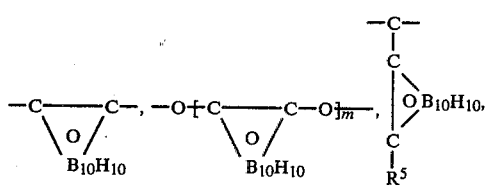

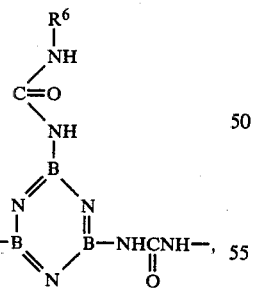

$R^5, R^7$=H, $C_n H_{2n+1}$, $C_n H_{2n-1}$, $C_n H_{2n-k+1} H_k$,

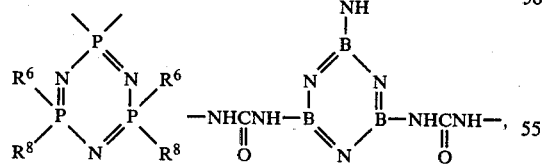

-continued

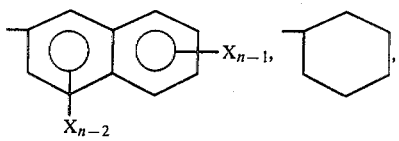

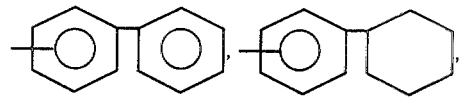

in this case, $R^5$ and $R^7$ may be equal or different; $R^6$, $R^8$=$C_n H_{2n+1}$, $C_n H_{2n-1}$, $C_n X_{2n-k+1} H_k$,

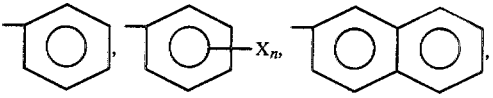

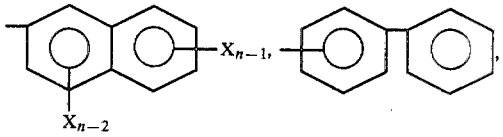

in this case, $R^6$ and $R^8$ may be equal or different $R^9$=X, $C_n H_{2n+1}$, $C_n H_{2n-1}$, $C_n H_k X_{2n-k+1}$,

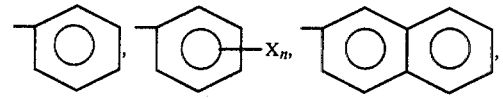

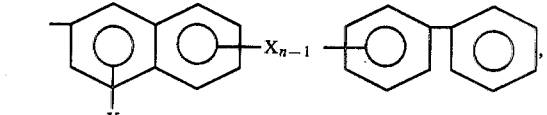

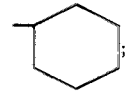

X=F, Cl, Br;
n=1-5; P=1-4; K=1-10;
m=1-1000; q=1-2000.

With a view to preventing the oxidizing effect of air oxygen, it is preferable to conduct the reaction of polyfunctional nitrile-containing compounds with polyfunctional isocyanates in an inert gas atmosphere or under vacuum.

The reaction of polyfunctional nitrile-containing compounds with polyfunctional isocyanates can be conducted in the presence of a solvent, which may then be removed by drying in air, an inert gas flow or under vacuum. The use of vacuum permits speeding up the process of drying. The use of a solvent allows obtaining a more homogeneous mixture, intensifying the reaction between the components. Besides, the use of a solvent improves the processability of the reaction mixture, specifically, simplifies impregnation of fillers and improves the pouring properties. Solidification of the reaction mixture in the presence of a solvent makes it possible to obtain a polymer product in the form of a homogeneous fine-pore solid substance.

As the solvent use is made of acetone, methylethylketone, pyridine, acetonitrile, acrylic acid nitrile, N,N-dimethylformamide, N,N-dimethylacetamide, N-methyl pyrrolidone, tetrahydrofuran, toluene, xylene, chloroform, dimethylsulfoxide, hexamethyl phosphotriamide or their mixtures, as well as other substances possessing solvency with respect to polyfunctional nitrile-containing compounds and polyfunctional isocyanates.

To speed up the reaction of polyfunctional nitrile-containing compounds with polyfunctional isocyanates, it is recommended to use various catalysts. As catalysts use is made of, particularly, N,N-dimethylaniline, N,N-diethylaniline, ethylacetate, and diethyl ether. Catalytic activity is also exhibited by some of the above solvents, namely, pyridine, N,N-dimethylformamide, N,N-dimethylacetamide, and hexamethyl phosphotriamide.

The properties of polymers and, particularly, their thermal stability depend on the structure of the starting monomers. As has been pointed out above, bis-ortho-aminonitriles or bis-ortho-hydroxynitriles used so far in combination with polyfunctional isocyanates, form polymers retaining stability while they are kept for a long time at temperatures not higher than 250° to 270° C. At the same time, a number of applications in modern technology require the use of polymers retaining their working characteristics for a long time at higher temperatures. Polymers obtained according to the present invention are stable at temperatures of 300° to 350° C. and higher.

The obtained polymers were characterized according to IR spectra, mass losses at 300°, 350°, 400°, 450°, and 500° C., as well as according to the properties of molding materials produced therefrom.

For example, as a result of bringing into reaction 7 g of an oligomer of the structure

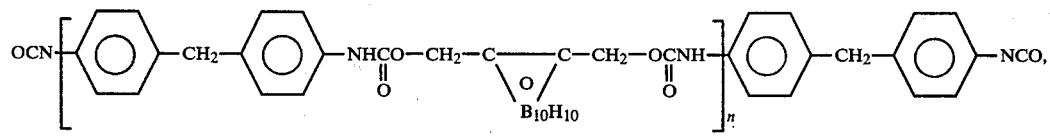

where n = 1 + 1.5, with 2 g of bis-o-aminonitrile of the structure

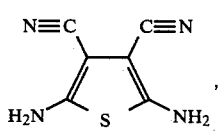

with heating said compounds for an hour up to 200° C. and maintaining them at 200° C. for an hour, there is formed a polymer which, after 100 hours, loses 9% of its mass at 300° C. in air. Under the same conditions, a polymer obtained on the basis of 3,3'-dicyan-4,4'-diaminodiphenylmethane and 4,4'-diisocyanatediphenylmethane, loses 21% of its mass.

Polymers obtained according to the proposed method, both without and with a solvent, are suitable for producing by known techniques, various materials, such as fabric-base laminates, molding materials, adhesives, abrasive tools, coatings, and filters. Such materials retain their physico-mechanical and dielectric properties at temperatures of 300° to 400° C. and higher.

The method for obtaining these polymers allows, if necessary, combining the process of polymer synthesis with that of producing an article on its basis, the steps of isolating and purifying the polymer being eliminated.

The method is simple and is effected in the following manner.

A nitrile-containing compound or a mixture of nitrile-containing compounds is thoroughly mixed with a polyfunctional isocyanate or a mixture of polyfunctional isocyanates. The obtained reaction mixture is heated up to a temperature of 90° to 400° C. The components used for conducting said reaction may be taken in the desired quantity from the beginning or are introduced into the reaction mixture in portions, in the course of the reaction. It is preferable to conduct the reaction in the atmosphere of an inert gas (for instance, argon), or under vacuum. The reaction can be conducted in the presence of, for instance, an organic solvent or a catalyst. After heating the reaction mixture at a temperature of 90° to 400° C., there is formed a solid polymer substance which can be used directly for the above-mentioned purposes.

For a better understanding of the present invention, the following specific examples are given below.

EXAMPLE 1

3.28 g of the compound of the formula

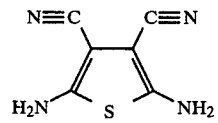

and 5 g of the compound of the formula

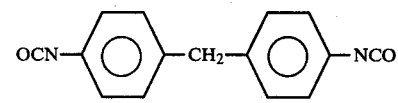

are thoroughly mixed and charged into a flask blown by argon. The mixture is heated to 170° C. and maintained at 170° to 190° C. for 2 hours, at 200° C. for 1 hour and at 300° C. for 0.5 hours. There is obtained a solid dark-brown polymer of the formula

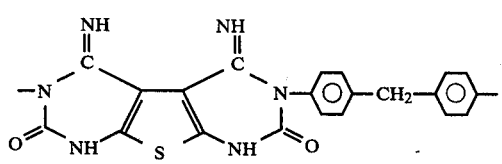

with a yield of 99%. According to IR-spectroscopy data, as a result of the reaction, absorption bands completely disappear within the range of 2,230 to 2,240 cm$^{-1}$, corresponding to isocyanate and nitrile groups.

The obtained polymer loses 3.2% of its mass after exposure to air at 300° C. for 500 hours.

EXAMPLE 2

2.64 g of the compound of the formula

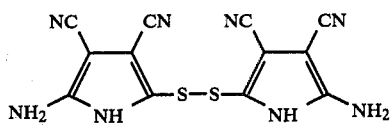

and 2.52 g of the compound of the formula

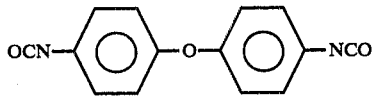

are dissolved together with 0.6 ml of trimethylamine in 40 ml of N-methyl pyrrolidone-2 at 10° C. During the mixing, the temperature of the solution is raised up to 50° C. and maintained at this level for 0.5 hours. The polymer is precipitated in 500 ml of water, washed with water, ethyl alcohol, and dried under vacuum (1 mm of Hg) at 40° C., then subjected to cyclization at a temperature of 300° C. in an argon atmosphere. As a result, there is obtained a light-brown product of the formula

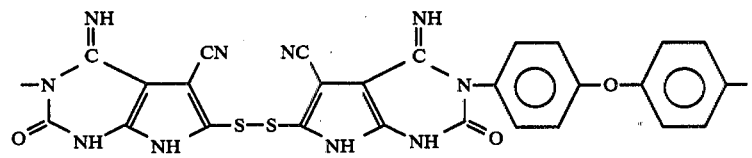

The end product yield is 90%. The obtained polymer loses 3.6% of its mass after exposure to air at 300° C. for 500 hours. The compressive strength of the molding material obtained from this polymer, at a temperature of 360° C. and a pressure of 700 kg/cm$^2$, is 950 kg/cm$^2$ and 600 kg/cm$^2$ at 20° and 300° C., respectively.

EXAMPLE 3

A mixture of 1.08 g of the compound of the formula

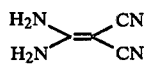

with 2.5 g of the compound of the formula

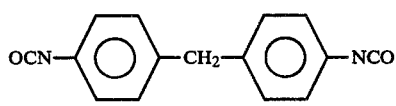

are charged into a flask blown with argon, heated to 170° C. for 1 hour and maintained first at this temperature for 2 hours, and then at 200° C. for 2 hours. Thereafter, the flask is evacuated (ultimate pressure of 1.10$^{-2}$ mm Hg) and maintained at 300° C. for 1 hour.

The obtained solid product is polyiminoquinazolone of the formula

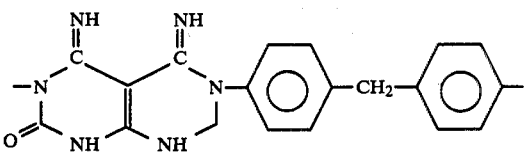

The polymer yield is 99.5%. The obtained polymer loses 2.9% of its mass after exposure to air at 300° C. for 200 hours.

EXAMPLE 4

0.294 g of the compound of the formula

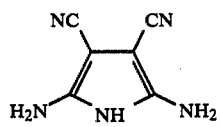

and 0.500 g of the compound of the formula

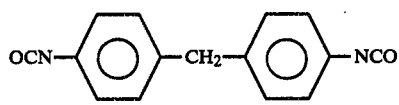

and ground in a mortar and charged into a flask which is blown with argon for 10 minutes. The flask is heated to 200° C. for 1 hour and maintained at 200° C. for 1 hour, and at 250° C. for 1 hour. There is obtained a dark-brown polymer of the formula

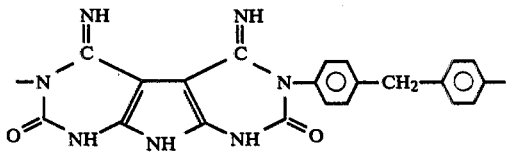

The ultimate composition of the obtained polymer is close to the theoretical: C 63.05% (theor. 63.47%), H 3.47% (theor. 3.77%), N 24.70% (theor. 24.68%). The polymer loses 2.2% of its mass after exposure to air at 300° C. for 500 hours. The compressive strength of the molding material obtained from this polymer is at a temperature of 270° C. and a pressure of 300 kg/cm$^2$, 1,050 kg/cm$^2$ and 650 kg/cm$^2$ at 20° and 300° C., respectively.

EXAMPLE 5

0.296 g of the compound of the formula

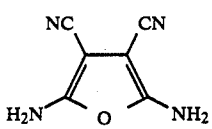

and 0.504 g of the compound of the formula

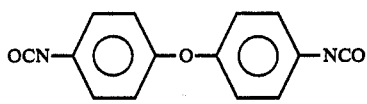

are mixed in a mortar and charged into a flask which is blown with argon for 10 min. The flask is heated to 180° C. and maintained at 180° C. for 1 hour, at 220° C. for 1 hour, and at 300° C. for 0.5 hours. There is obtained a red-brown polymer. The ultimate composition of the obtained polymer is close to the theoretical: C 59.90% (theor. 60.01%), H 3.13% (theor. 3.01%), N 21.00% (theor. 21.02%). The polymer loses 2.3% of its mass after exposure to air at 300° C. for 500 hours.

EXAMPLE 6

0.524 g of the compound of the formula

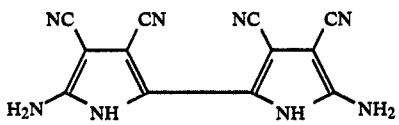

and 0.500 g of the compound of the formula

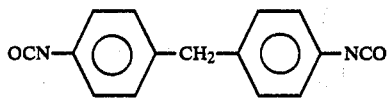

are dissolved in 30 ml of N-methyl pyrrolidone-2. The obtained solution is kept at 30° C. for 2 hours, then poured into 150 ml of water. The resulting precipitate is filtered off, washed with 30 ml of acetone and dried under vacuum at 20° C. There is obtained polycyanurea, yellow in colour, with a reduced viscosity of 0.20 dl/g (0.5% solution in conc. $H_2SO_4$). As a result of heating the obtained polycyanurea under vacuum ($2.10^{-2}$ mm Hg) at a temperature of 300° C. for 1 hour, there is obtained red-brown polyiminoquinazolone of the formula

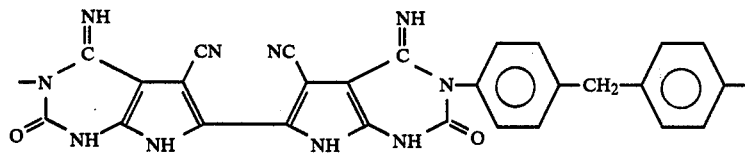

in the IR spectrum whereof there is not any absorption band within the range of from 2,230 to 2,240 $cm^{-1}$, corresponding to the CN-group. The ultimate composition of the obtained polyiminoquinazolone is close to the theoretical: C 63.30% (theor. 63.28%), H 3.10% (theor. 3.12%), N 27.25% (theor. 27.34%).

EXAMPLES 7–40

According to the procedure described in Example 1, there are obtained polymers on the basis of nitrile-containing compounds and polyfunctional isocyanates. The ratio of the reaction mixtures components is given in Table 1. Presented in the same Table are conditions of heat ageing and mass loss in the process of ageing of the obtained polymer products.

EXAMPLE 41

3.26 g of the compound of the formula

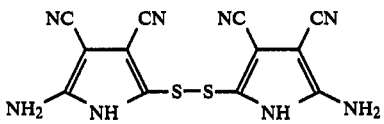

and 1.31 g of the compound of the formula

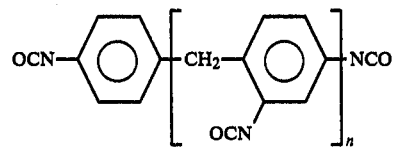

are thoroughly mixed with 2 ml of pyridine. The obtained reaction mixture is heated at 90° C. first for 20 hours, in air, then for 10 hours under vacuum. In the meantime, the reaction mixture solidifies. The resulting polymer loses 7% of its mass in the process of ageing at 300° C. for 500 hours in an argon atmosphere.

EXAMPLES 42–56

From the starting reagents described in Example 41 and solvents, there are obtained polymers which were subjected to heat ageing at 300° C. om aor fpr 100 hours. The type and quantity of solvent, conditions of solidification of the reaction mixture, first in air and then under vacuum, as well as the heat ageing data are listed in Table 2.

EXAMPLES 57–60

According to the procedure described in Example 2, there are obtained polymers using, as catalysts, N,N-dimethylaniline, N,N-diethylaniline, ethylacetate, and diethyl other instead of triethylamine. Catalysts were taken in an amount of 0.5 mole per 1 mole of the nitrile-containing compound. The polymer yield was, respectively, 92%, 93.5%, 86% and 83%.

TABLE 1
| Example No. | Reaction mixture composition | components, mole/mole ratio, mole | atmosphere | Conditions of heat ageing temperature, °C. | time, hour | mass losses, wt % |
|---|---|---|---|---|---|---|
| 1 | 2 | 3 | 4 | 5 | 6 | 7 |
| 7 | 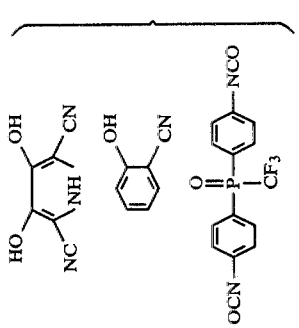 | 1:0.02:1 | air | 400° | 10 | 7 |
| 8 | 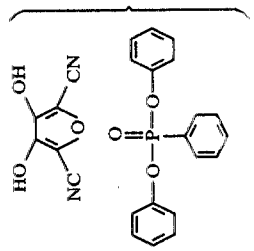 | 1:1 | air | 350° | 100 | 20 |

TABLE 1-continued
| Example No. | Reaction mixture composition | components ratio, mole/mole | atmosphere | temperature, °C. | time, hour | mass losses, wt % |
|---|---|---|---|---|---|---|
| 1 | 2 | 3 | 4 | 5 | 6 | 7 |
| 9 |  | 1:0.7:0.01 | air | 400° | 5 | 12 |
| 10 | 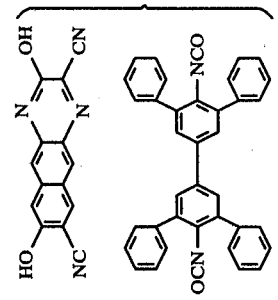 | 1:1 | air | 300° | 1000 | 2,4 |

TABLE 1-continued

| Example No. | Reaction mixture composition | components ratio, mole/mole | Conditions of heat ageing | | | |
|---|---|---|---|---|---|---|
| | | | atmosphere | temperature, °C. | time, hour | mass losses, wt % |
| 1 | 2 | 3 | 4 | 5 | 6 | 7 |
| 11 | [structures shown] | 1:1.2 | argon | 350° | 25 | 11 |
| 12 | [structures shown] | 1:2 | air | 500° | 10 | 28 |

TABLE 1-continued

| Example No. | Reaction mixture composition | components ratio, mole/mole | Conditions of heat ageing ||||
|---|---|---|---|---|---|---|
| | | | atmosphere | temperature, °C. | time, hour | mass losses, wt % |
| 1 | 2 | 3 | 4 | 5 | 6 | 7 |
| 13 | (structures shown) | 1:1.3:0.01 | nitrogen | 400° | 25 | 17 |

TABLE 1-continued
| Example No. | Reaction mixture composition | components ratio, mole/mole | Conditions of heat ageing | | | mass losses, wt % |
|---|---|---|---|---|---|---|
| 1 | 2 | 3 | atmosphere 4 | temperature, °C. 5 | time, hour 6 | 7 |
| 14 | 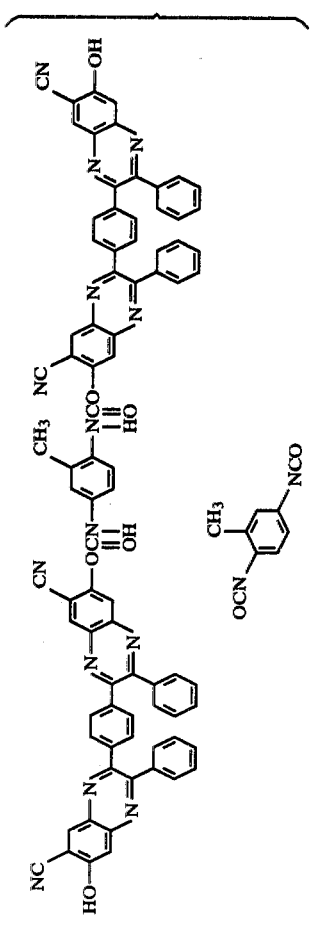 | 1:1 | air | 350° | 90 | 40 |
| 15 | 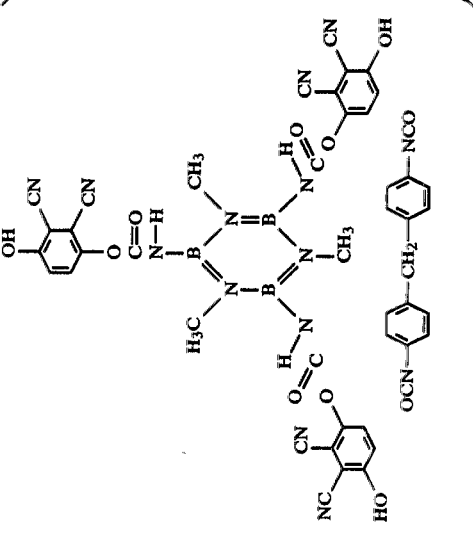 | 2:3 | air | 350° | 100 | 8 |

TABLE 1-continued

| Example No. 1 | Reaction mixture composition 2 | components ratio, mole/mole 3 | Conditions of heat ageing | | | mass losses, wt % 7 |
|---|---|---|---|---|---|---|
| | | | atmosphere 4 | temperature, °C. 5 | time, hour 6 | |
| 16 | (structure shown) | 1:1 | air | 550° | 1000 | 26 |
| 17 | (structure shown) | 1:0.6 | air | 400° | 10 | 14 |
| 18 | (structure shown) | 1:1 | argon | 500° | 10 | 9 |

TABLE 1-continued
| Example No. | Reaction mixture composition | components ratio, mole/mole | Conditions of heat ageing | | | mass losses, wt % |
|---|---|---|---|---|---|---|
| | | | atmosphere | temperature, °C. | time, hour | |
| 1 | 2 | 3 | 4 | 5 | 6 | 7 |
| 19 | 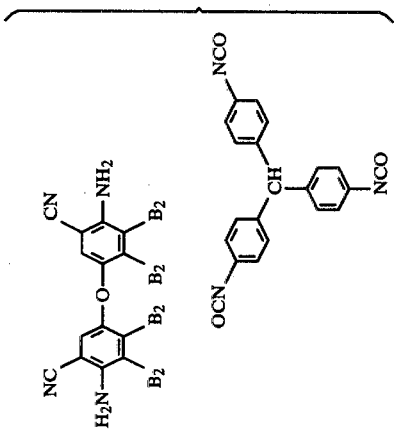 | 1:0.7 | air | 300° | 200 | 16 |
| 20 | 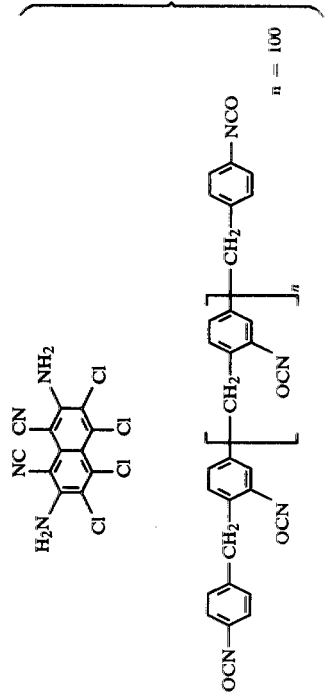 | 1:0.1 | air | 300° | 1000 | 14 |

TABLE 1-continued

| Example No. | Reaction mixture composition | components ratio, mole/mole | Conditions of heat ageing | | | |
|---|---|---|---|---|---|---|
| | | | atmosphere | temperature, °C. | time, hour | mass losses, wt % |
| 21 | [structure with NC, CN, NH, S—S, NH₂, and repeating unit n = 17 with NHCNH, O, OCN end group] | 1:1 | nitrogen | 300° | 1000 | 4 |
| 22 | [structure with CN, OH, NCO, CF₃ groups and OCN end groups] | 1:1:2 | nitrogen | 300° | 2000 | 10 |

TABLE 1-continued

| Example No. 1 | Reaction mixture composition 2 | components ratio, mole/mole 3 | atmosphere 4 | Conditions of heat ageing temperature, °C. 5 | time, hour 6 | mass losses, wt % 7 |
|---|---|---|---|---|---|---|
| 23 | (structure shown) | 1:5:7 | air | 350° | 1000 | 27 |
| 24 | (structure shown) | 1:1 | air | 300° | 200 | 4 |

TABLE 1-continued

| Example No. | Reaction mixture composition | components ratio, mole/mole | Conditions of heat ageing | | | mass losses, wt % |
|---|---|---|---|---|---|---|
| | | | atmosphere | temperature, °C. | time, hour | |
| 1 | 2 | 3 | 4 | 5 | 6 | 7 |
| 25 | [structure: siloxane chain with CH₃/Si–O repeating units bearing CN/NH₂-substituted phenyl groups, n = 260; with OCN-cyclohexyl-NCO (isophorone-type) diisocyanate] | 1:50 | air | 350° | 20 | 6 |
| 26 | [structure: polyamide chain with Cl, CN, CNO substituted aromatic units, NH₂ end groups, n = 380; with hexafluoro bis-isocyanate OCN–C(F)(F)–C(F)(F)–NCO] | 1:1 | air | 300° | 350 | 5 |

TABLE 1-continued

| Example No. | Reaction mixture composition | components ratio, mole/mole | Conditions of heat ageing atmosphere | temperature, °C. | time, hour | mass losses, wt % |
|---|---|---|---|---|---|---|
| 1 | 2 | 3 | 4 | 5 | 6 | 7 |
| 27 | (structure) | 1:0.3:1.5 | air | 300° | 100 | 26 |
| 28 | (structure, n=185) | 1:1 | air | 350° | 10 | 9 |

TABLE 1-continued

| Example No. | Reaction mixture composition | components ratio, mole/mole | Conditions of heat ageing ||| mass losses, wt % |
|---|---|---|---|---|---|---|
| | | | atmosphere | temperature, °C. | time, hour | |
| 1 | 2 | 3 | 4 | 5 | 6 | 7 |
| 29 | $\underbrace{\text{H}_2\text{N}-\text{C}_6\text{H}_2(\text{CN})_2-\text{NH}_2,\ \text{HO}-\text{C}_6\text{H}_3(\text{CN})-\text{OH},\ \text{OCN}-\text{C}_6\text{F}_4-\text{CF}_2-\text{C}\equiv\text{C}-\text{B}_{10}\text{H}_{10}-\text{C}-\text{CF}_2-\text{C}_6\text{F}_4-\text{NCO}}$ | 1:3:5 | argon | 450° | 50 | 14 |
| 30 | $\underbrace{\text{H}_2\text{N}-\text{C}_6\text{H}_3(\text{CN})-\text{NH}_2,\ \text{OCN}-\text{C}-\text{B}_{10}\text{H}_{10}-\text{C}-\text{NCO}}$ | 1:1 | air | 350° | 100 | 13 |
| 31 | $\underbrace{\text{HO}-\text{C}_6\text{H}_3(\text{CN})-\text{OH},\ \text{HO}-\text{C}_6\text{H}_3(\text{CN})-\text{OH},\ \text{OCN}-(\text{CF}_2)_5-\text{NCO}}$ | 1:1:2 | air | 350° | 200 | 24 |

TABLE 1-continued

| Example No. | Reaction mixture composition | components ratio, mole/mole | Conditions of heat ageing | | | mass losses, wt % |
|---|---|---|---|---|---|---|
| | | | atmosphere | temperature, °C. | time, hour | |
| 1 | 2 | 3 | 4 | 5 | 6 | 7 |
| 32 | (structure: cyanodiaminobenzene + diphenylsilyl-bis(OCN-phenoxy)) | 1:1 | air | 350° | 30 | 11 |
| 33 | (structure: dimethylsilyl bis(aminocyanophenoxyphenyl) + bis(OCN-B₂-phenyl)naphthalenetetracarboxydiimide) | 1:1 | air | 350° | 1200 | 31 |
| 34 | (structure: bis(aminocyanopyridyl)methane derivative + bis(OCN-phenoxy)) | 1:50 | air | 300° | 800 | 7 |

TABLE 1-continued
| Example No. | Reaction mixture composition | components ratio, mole/mole | Conditions of heat ageing | | | mass losses, wt % |
| --- | --- | --- | --- | --- | --- | --- |
| | | | atmosphere | temperature, °C | time, hour | |
| 1 | 2 | 3 | 4 | 5 | 6 | 7 |
| 35 | 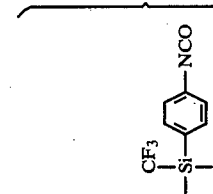 | 1:0.8 | air | 350° | 100 | 33 |
| 36 | 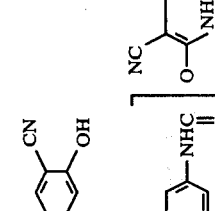 | 1:1:2 | air | 350° | 100 | 18 |

TABLE 1-continued

| Example No. | Reaction mixture composition | components ratio, mole/mole | Conditions of heat ageing | | | |
|---|---|---|---|---|---|---|
| | | | atmosphere | temperature, °C. | time, hour | mass losses, wt % |
| 1 | 2 | 3 | 4 | 5 | 6 | 7 |
| 37 | [structure: dicyano-dihydroxy pyridazine linked via N—N to phthalimide dione; and octachlorodiphenyl ether with NCO and OCN groups] | 1:1 | air | 350° | 10 | 6 |
| 38 | [structures: diaminomaleonitrile (H₂N, H₂N, CN, CN on C=C); and polymer with CH₂-bridged aromatic units bearing NCO and OCN, n = 400] | 1:0.05 | air | 300° | 50 | 8 |

TABLE 1-continued
| Example No. | Reaction mixture composition | components ratio, mole/mole | atmosphere | Conditions of heat ageing temperature, °C | time, hour | mass losses, wt % |
|---|---|---|---|---|---|---|
| 1 | 2 | 3 | 4 | 5 | 6 | 7 |
| 39 | | 1:1 | air | 400° | 10 | 5 |
| 40 | | 1:1 | air | 300° | 100 | 14 |
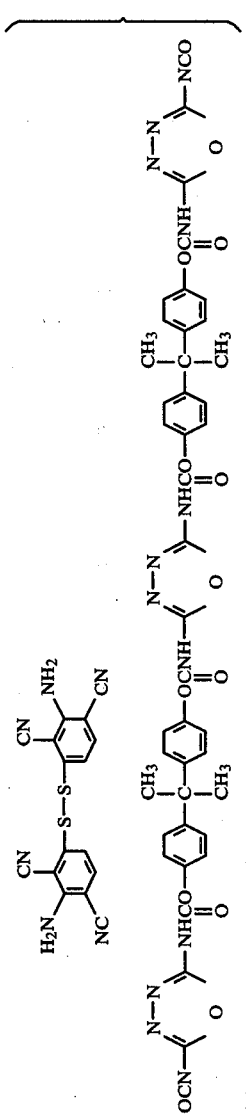

TABLE 2

| Example No. | Solvent | Solvent quantity, ml | Solidifying point of the reaction mixture in air | Solidifying point of the reaction mixture under vacuum | Mass loss after 100 hours of exposure to air at 300° C., wt % |
|---|---|---|---|---|---|
| 42. | acetone | 3 | 40° | 90° | 9 |
| 43. | methylethylketone | 4 | 70° | 90° | 7 |
| 44. | acetonitrile | 2 | 90° | 90° | 6 |
| 45. | acrylic acid nitrile | 2 | 140° | 120° | 16 |
| 46. | N,N-dimethylformamide | 1 | 130° | 130° | 8 |
| 47. | N,N-dimethylacetamide | 1 | 140° | 200° | 9 |
| 48. | N-methyl pyrrolidone | 1 | 180° | 250° | 4 |
| 49. | tetrahydrofuran | 3 | 40° | 90° | 12 |
| 50. | toluene | 0.5 | 60° | 200° | 14 |
| 51. | xylene | 0.5 | 60° | 200° | 15 |
| 52. | chloroform | 2 | 40° | 200° | 17 |
| 53. | dimethylsulfoxide | 1 | 70° | 140° | 11 |
| 54. | hexamethyl phosphotriamide | 3 | 90° | 200° | 3 |
| 55. | toluene pyridine | 0.5 0.5 | 90° | 90° | 6 |
| 56. | acetonitrile chloroform | 0.5 4 | 40° | 90° | 8 |

What is claimed is:

1. Heat-resistant heterocyclic polymers of the formula:

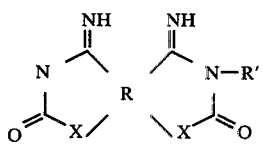

wherein
X is NH or O;
R is

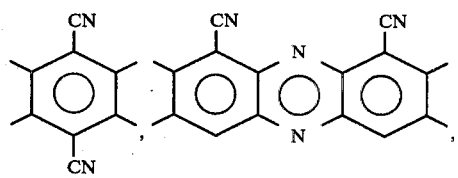

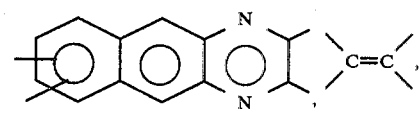

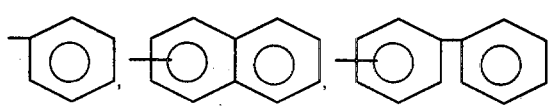

$R^2$ and $R^3$ = H, $C_fH_{2f+1}$, $C_fH_{2f-1}$,

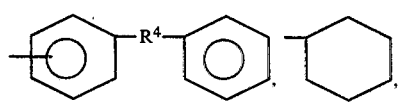

-continued

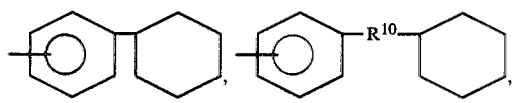

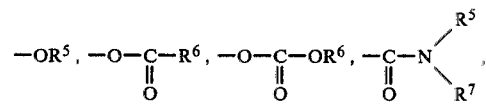

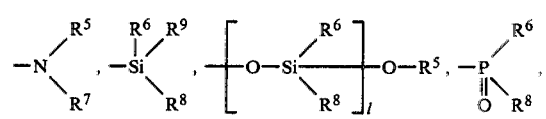

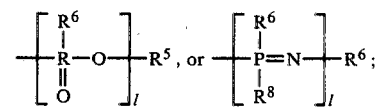

$R^4$ and $R^{10}$ =

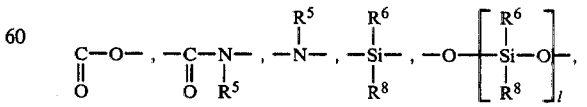

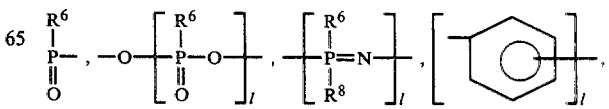

-continued

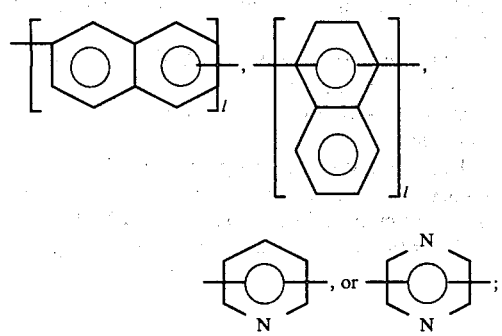

$R^5$ and $R^7$ are the same or different and $=H, C_fH_{2f+1}$, $C_fH_{2f-1}$,

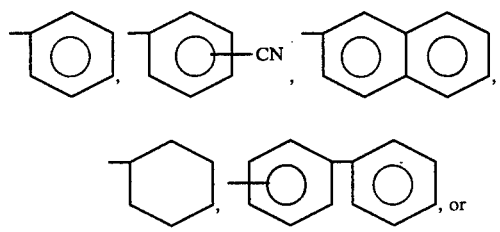

$R^6$ and $R^8$ are the same or different $=C_fH_{2f+1}$, $C_fH_{2f-1}$,

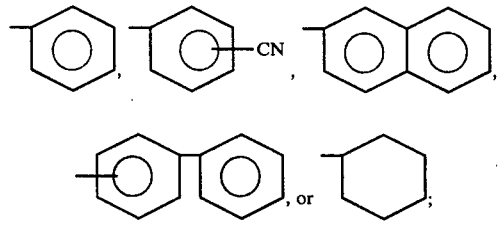

$R^9 = C_fH_{2f+1}$, $C_fH_{2f-1}$,

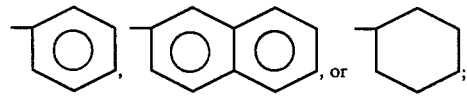

$f = 1-5$, $l = 1-1000$,

R also being an organic radical comprising at least one saturated or unsaturated hydrocarbon pentatomic cycle; a pentatomic heterocycle comprising at least one atom selected from the group consisting of nitrogen, sulfur and oxygen; a cyclic compound of boron and phosphorus or boron or phosphorus, an aromatic radical comprising halogen atoms connected directly to the aromatic fragment; a halogen-containing aliphatic radical of 2–1000 carbon atoms; an aromatic nitrile-containing radical with a nitrile group in meta position an amino or hydroxy group; an organic residue comprising at least one fragment selected from the group consisting of

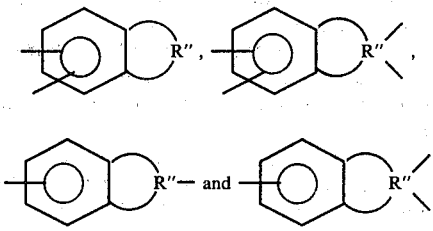

wherein $R^{11}$ is an organic radical containing 3 to 8 atoms selected from the group consisting of carbon, nitrogen and sulfur; a radical of the structure:

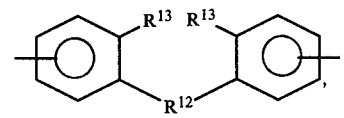

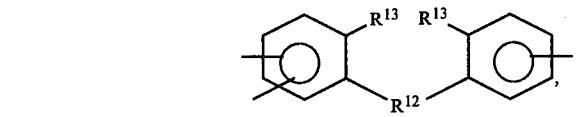

wherein
$R^{12} = -NH-CO-NH-$, $-NH-CO-$, $-NH-CO-O-$, $-CH=N-$, $R^{13} = H, CN$,

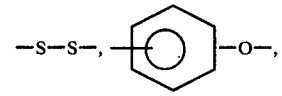

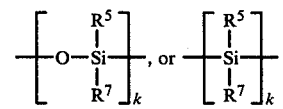

$K = 5-100$, and wherein $R'$ is an organic radical of 2–1000 carbon atoms; a radical of 2–1000 carbon atoms and including at least one of the elements silicon, fluorine, chlorine, bromine, nitrogen, phosphorus, boron, and oxygen, each of said elements being in an amount of 1 to 1000 atoms.

2. Method of producing heat resistant heterocyclic polymers of claim 1, which comprises effecting reaction at a temperature of 90° to 400° C. between polyfunctional nitrile-containing compounds of the formula:

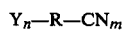

wherein Y is selected from the group consisting of $NH_2$ and OH, CN is in alpha-, beta-, ortho-, or peri-position relative to Y, N is greater than 1 and m is greater than 1; with a polyfunctional isocyanate of the formula:

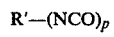

wherein p is equal to or greater than 2.

3. A method according to claim 2, wherein the reaction of nitrile-containing compounds with polyfunctional isocyanates is conducted in the atmosphere of an inert gas.

4. A method according to claim 2, wherein the reaction of nitrile-containing compounds with polyfunctional isocyanates is conducted under vacuum.

5. A method according to claim 2, wherein the reaction of nitrile-containing compounds with polyfunctional isocyanates is conducted in the presence of a solvent.

6. A method according to claim 5, wherein, as the solvent, use is made of a solvent selected from the group consisting of acetone, methylethylketone, pyridine, acetonitrile, acrylic acid nitrile, N,N-dimethylformamide, N,N-dimethylacetamide, N-methyl pyrrolidone, tetrahydrofuran, toluene, xylene, chloroform, dimethylsulfoxide, hexamethyl phosphortriamide, and their mixtures.

7. A method according to claim 2, wherein the reaction of nitrile-containing compounds with polyfunctional isocyanates is conducted in the presence of a catalyst.

8. A method according to claim 7, wherein, as the catalyst, use is made of a catalyst selected from the group consisting of triethylamine, N,N-dimethylaniline, N,N-diethylaniline, ethylacetate, and diethyl ether.

* * * * *